United States Patent
Balcacer

(10) Patent No.: US 10,610,041 B2
(45) Date of Patent: Apr. 7, 2020

(54) LEMON SQUEEZER

(71) Applicant: Flavia Balcacer, Manhattan, NY (US)

(72) Inventor: Flavia Balcacer, Manhattan, NY (US)

(*) Notice: Subject to any disclaimer, the term of this patent is extended or adjusted under 35 U.S.C. 154(b) by 204 days.

(21) Appl. No.: 15/906,128

(22) Filed: Feb. 27, 2018

(65) Prior Publication Data
US 2019/0261804 A1  Aug. 29, 2019

(51) Int. Cl.
*B30B 9/04* (2006.01)
*B30B 9/06* (2006.01)
*B30B 1/04* (2006.01)
*A47J 19/02* (2006.01)
*A23N 1/00* (2006.01)

(52) U.S. Cl.
CPC .............. *A47J 19/02* (2013.01); *A23N 1/003* (2013.01); *A47J 19/023* (2018.08); *B30B 1/04* (2013.01); *B30B 9/04* (2013.01); *B30B 9/06* (2013.01)

(58) Field of Classification Search
CPC .... B30B 9/02; B30B 9/04; B30B 9/06; B30B 9/26; B30B 9/3053; B30B 1/04; B30B 15/08; A47J 19/02; A47J 19/023; A47J 19/022; A47J 19/04; A47J 19/06; A47J 19/005; A47J 2043/04481; A47J 2043/0449; A47J 43/286; A47J 44/00; A47J 43/04; A23N 1/00; A23N 1/003; A23N 1/02; A23L 1/00; A23L 2/04
USPC ................ 100/110, 112, 233, 265, 283, 293; 99/495, 501, 503, 506, 508, 513, 565
See application file for complete search history.

(56) References Cited

U.S. PATENT DOCUMENTS

| | | | | |
|---|---|---|---|---|
| 2,584,333 A * | 2/1952 | Crot | ........................... | B30B 1/12 100/233 |
| 5,263,408 A * | 11/1993 | Blanchet | ................... | B30B 9/04 100/125 |
| 5,396,838 A * | 3/1995 | Casapulla | ............. | A47J 43/286 100/116 |
| 6,813,996 B1 * | 11/2004 | Kao | ....................... | A47J 19/023 99/507 |
| 2015/0296842 A1 * | 10/2015 | Romano | ................. | A47J 43/20 426/637 |

\* cited by examiner

*Primary Examiner* — Jimmy T Nguyen
(74) *Attorney, Agent, or Firm* — Ruben Alcoba, Esq.

(57) ABSTRACT

An improved lemon squeezer includes a stand. The stand has a footprint that extends outward from the front of the stand. The stand defines a top and a bottom plate. The bottom plate is a plate that defines a plurality of depression and it defines a fluid receiving a cavity. The top plate defines a plurality of protrusions that insert within the bottom plates depressions when the plates are squeezed together via a lever mechanism that is attached to the top plate.

2 Claims, 1 Drawing Sheet

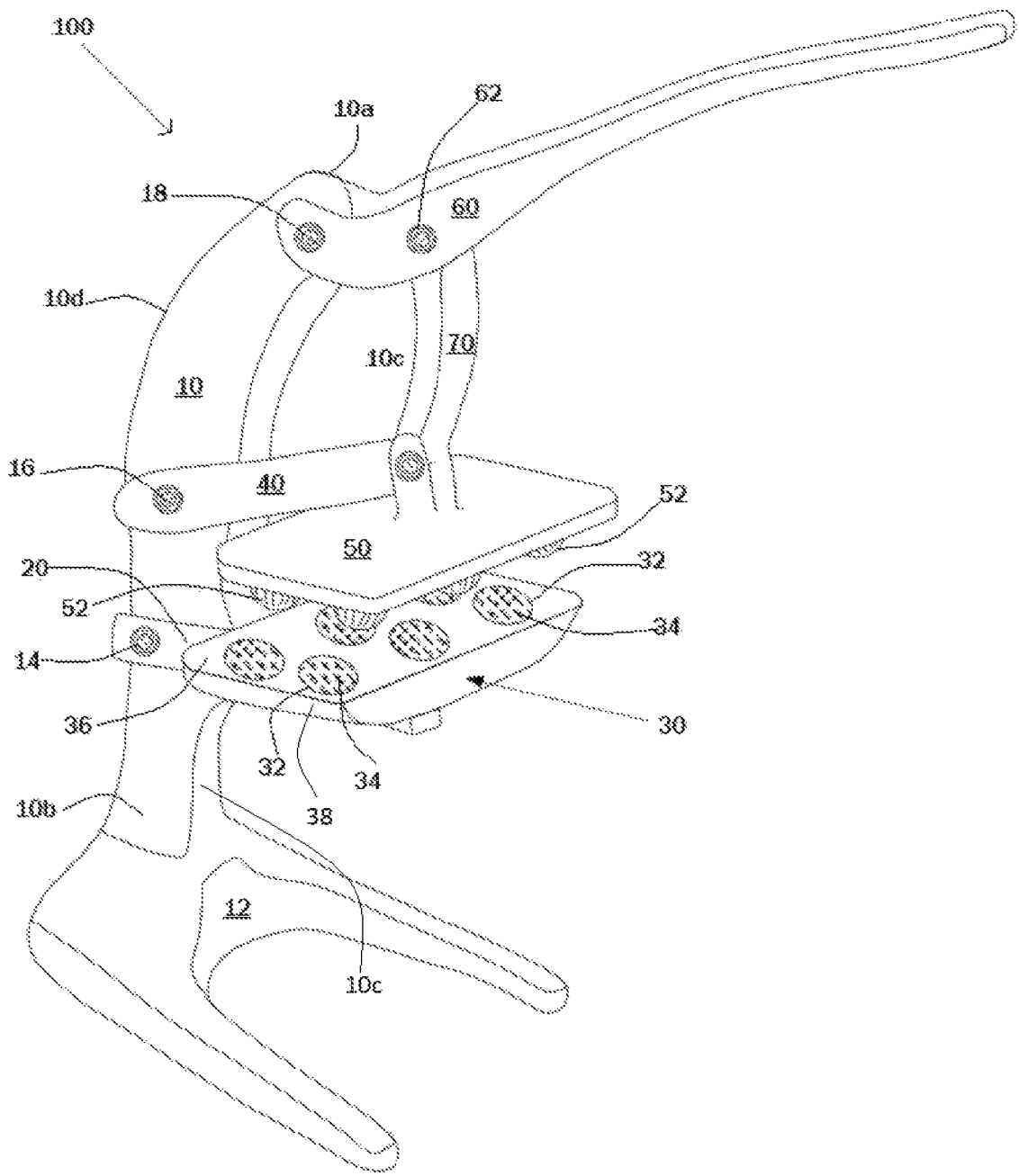

LEMON SQUEEZER

BACKGROUND

The present invention is directed to an improved manual lemon squeezer that allows more than one lemon to be squeezed at a time.

The invention was conceived to facilitate the squeezing of lemons.

The inventor understands the health benefits of freshly squeezed lemons and she needed a device that would squeeze more than one lemon at a time.

Her need caused her to conceive a device wherein she could place more than one half lemon into the device and wherein she could squeeze the device using her body weight rather than her grip strength.

For the foregoing reason there is a need for an improved lemon squeezer that will allow more than on half lemon to be squeezed at a time.

SUMMARY

The present invention describes an improved lemon squeezer that will allow more than one half lemon to be squeezed at a time.

The improved lemon squeezer comprises of a stand that has a front and a back, the stand has a footprint that extends at least 6 inches outward from the front of the stand. The stand defines three plate securing points. The first securing point is at a location that is at a midpoint between the top and the bottom of the stand. The first securing point secures a first arm, the first arm secures a bottom plate to the stand. The bottom plate defines a plurality of depressions and each depression defines a plurality through holes. The bottom plate defines a fluid receiving cavity. The bottom plate has a removable top that attaches to the bottom plate. The second securing point secures a second arm and it is at least 2 inches above the first securing point. The second arm is attached to a top plate, the top plate defines a plurality of protrusion that line up with the depressions of the bottom plate when the top and bottom plates are pressed together. The third securing point is located at the top of the stand. A lever is attached to the third securing point. The lever extends outward from the front of the stand. The lever defines a connector securing point. A curved connecter is attached to the connector securing point and to the top plate at the same location that the second arm was attached to the top plate.

In a preferred embodiment, the bottom plate will slide on to the first arm via a track system that will be defined on a lower part of the bottom plate.

An object of the present invention is to provide an improved lemon squeezer that will allow more than one half lemon to be squeezed at the a time.

Another object of the present invention is to provide and improved lemon squeezer that will allow people whom do not have gripping strength to squeeze lemons in an efficient manner.

Yet another object of the present invention is to provide an improved lemon squeezer that will allow bartenders and waitstaff an efficient manner of squeezing lemons.

DRAWINGS

These and other features, aspects, and advantages of the present invention will become better understood with regards to the following description, appended claims, and drawings where:

FIG. 1 is a perspective view of an improved lemon squeezer.

DESCRIPTION

As seen in FIG. 1, the present invention is an improved lemon squeezer. The improved lemon squeezer 100 comprises a stand 10 that has a top 10a, a bottom 10b, a front 10c and a back 10d, the stand 10 has a footprint 12 that extends outward from the front of the stand 10c, the stand 10 defines three plate securing points 14, 16 and 18 and the first securing point 14 is at a location that is at a midpoint between the top 10a and the bottom 10b of the stand 10 . A first arm 20 is secured to the first securing point 14 of the stand 10. A bottom plate 30 is secured to the first arm 20, the bottom plate 30 defines a plurality of depressions 32 and each depression defines a plurality through holes 34, the bottom plate defines a fluid receiving cavity 38, and the bottom plate 30 has a removable top 36 that attaches to the bottom plate 30. A second arm 40 is secured to the second securing point of the stand 16 at a distance that is above the first securing point 14. A top plate 50 is secured to the second arm 40, the top plate 50 defines a plurality of protrusion 52 that line up with the depressions 32 of the bottom plate 30 when the top 50 and bottom plates 30 are pressed together. A lever 60 is attached to the third securing point 18, the third securing point 18 is at the top of the stand 10a, the lever 60 extends outward from the front of the stand 10c, the lever 60 defines a connector securing point 62. And, a curved connecter 70 is attached to the connector securing point of the lever 62 and to the top plate 50 at the same location that the second arm 40 was attached to the top plate 50.

In a preferred embodiment, the lever will measure at least six inches, the footprint will extend outwards at least six inches and the distance between the first and second plate securing points will be at least 2 inches.

In another preferred embodiment, the bottom plate will attach to the first arm via a track that will be defined on a centered bottom portion of the bottom plate (not shown in the Figure).

An advantage of the present invention is that it provides an improved lemon squeezer that allows more than one half lemon to be squeezed at a time.

Another advantage of the present invention is that it provides and improved lemon squeezer that allows people whom do not have gripping strength to squeeze lemons in an efficient manner.

Yet another advantage of the present invention is that it provides an improved lemon squeezer that allows bartenders and waitstaff an efficient manner of squeezing lemons.

While the inventor's above description contains many specificities, these should not be construed as limitations on the scope, but rather as an exemplification of several preferred embodiments thereof. Accordingly, the scope should not be determined by the embodiments illustrated, but by the appended claims and their legal equivalents.

What is claimed is:

1. An improved lemon squeezer, the lemon squeezer comprises of:
   a stand that has a top, a bottom, a front and a back, a footprint extends outward from the front of the stand, the stand defines first, second, and third securing points and the first securing point is at a location that is at a midpoint between the top and the bottom of the stand;
   a first arm is secured to the first securing point of the stand;

a bottom plate is secured to the first arm, the bottom plate defines a plurality of depressions and each of the depressions defines a plurality through holes, the bottom plate defines a fluid receiving cavity, and a removable top attaches to the bottom plate;

a second arm is secured to the second securing point of the stand at a distance that is above the first securing point;

a top plate is secured to the second arm, the top plate defines a plurality of protrusions that line up with the depressions of the bottom plate when the top and bottom plates are pressed together;

a lever is attached to the third securing point, the third securing point is at the top of the stand, the lever extends outward from the front of the stand, the lever defines a connector securing point; and a curved connecter is attached to the connector securing point of the lever and to the top plate at the same location that the second arm was attached to the top plate.

2. The improved lemon squeezer of claim 1, wherein the lever measures at least six inches, the footprin extends outwards at least six inches and a distance between the first and second securing points is at least 2 inches.

\* \* \* \* \*